US012270415B2

(12) United States Patent
Toni et al.

(10) Patent No.: US 12,270,415 B2
(45) Date of Patent: Apr. 8, 2025

(54) DIFFUSER WITH NON-CONSTANT DIFFUSER VANES PITCH AND CENTRIFUGAL TURBOMACHINE INCLUDING SAID DIFFUSER

(71) Applicant: NUOVO PIGNONE TECNOLOGIE - S.R.L., Florence (IT)

(72) Inventors: Lorenzo Toni, Florence (IT); Vittorio Michelassi, Florence (IT)

(73) Assignee: Nuovo Pignone Tecnologie—S.R.L., Florence (IT)

( * ) Notice: Subject to any disclaimer, the term of this patent is extended or adjusted under 35 U.S.C. 154(b) by 0 days.

(21) Appl. No.: 17/758,936

(22) PCT Filed: Jan. 15, 2021

(86) PCT No.: PCT/EP2021/025010

§ 371 (c)(1),
(2) Date: Jul. 15, 2022

(87) PCT Pub. No.: WO2021/148237

PCT Pub. Date: Jul. 29, 2021

(65) Prior Publication Data

US 2023/0042068 A1 Feb. 9, 2023

(30) Foreign Application Priority Data

Jan. 22, 2020 (IT) ........................ 102020000001216

(51) Int. Cl.
*F04D 29/44* (2006.01)
*F04D 29/66* (2006.01)

(52) U.S. Cl.
CPC ......... *F04D 29/444* (2013.01); *F04D 29/666* (2013.01); *F05D 2250/52* (2013.01); *F05D 2260/961* (2013.01)

(58) Field of Classification Search
CPC ...... F04D 29/444; F04D 29/666; F04D 17/10; F04D 25/04; F04D 29/056; F04D 29/284;
(Continued)

(56) References Cited

U.S. PATENT DOCUMENTS 5,516,263 A * 5/1996 Nishida ................. F04D 29/444
415/208.4
5,529,457 A * 6/1996 Terasaki ................ F04D 29/444
415/208.4

(Continued)

FOREIGN PATENT DOCUMENTS

CN 103244462 B 8/2013
DE 37 05 307 A1 9/1988

(Continued)

*Primary Examiner* — Woody A Lee, Jr.
*Assistant Examiner* — Eric A Lange
(74) *Attorney, Agent, or Firm* — Paul Frank + Collins P.C.

(57) ABSTRACT

A novel diffuser for a centrifugal turbomachine to reduce or prevent stall. The diffuser includes diffuser vanes arranged around a diffuser axis. Each diffuser vane includes: a leading edge, a trailing edge, a suction side facing radially inwardly, and a pressure side facing radially outwardly. A respective flow passage is defined between the suction side of a first diffuser vane and the pressure side of a second diffuser vane of each pair of adjacently arranged diffuser vanes. The diffuser vanes are arranged with a non-constant pitch around the diffuser axis. The pitch between each pair of adjacently arranged first diffuser vane and second diffuser vane defining a respective flow passage there between is correlated to a chord of one of said first diffuser vane and second diffuser vane.

10 Claims, 9 Drawing Sheets

(58) Field of Classification Search
CPC ............ F05D 2250/52; F05D 2250/54; F05D 2260/961
See application file for complete search history.

(56) References Cited

U.S. PATENT DOCUMENTS

| | | | | |
|---|---|---|---|---|
| 6,203,275 | B1 | 3/2001 | Kobayashih et al. | |
| 7,845,900 | B2 | 12/2010 | Roduner et al. | |
| 2013/0280060 | A1* | 10/2013 | Nasir | F04D 29/444 415/208.2 |
| 2017/0152861 | A1* | 6/2017 | Japikse | F04D 29/462 |

FOREIGN PATENT DOCUMENTS

| | | | |
|---|---|---|---|
| JP | 2007315333 | A * | 12/2007 |
| WO | 2011/096981 | A1 | 8/2011 |
| WO | 2015/197536 | A1 | 12/2015 |

* cited by examiner

DIFFUSER WITH NON-CONSTANT DIFFUSER VANES PITCH AND CENTRIFUGAL TURBOMACHINE INCLUDING SAID DIFFUSER

TECHNICAL FIELD

The present disclosure concerns radial turbomachines. More specifically, embodiments of the present disclosure concern centrifugal turbomachines, such as centrifugal pumps and/or centrifugal compressors including one or more novel bladed diffusers, i.e. vaned diffusers.

BACKGROUND ART

Centrifugal compressors are used in a variety of applications to boost the pressure of gas. Centrifugal compressors include a casing and one or more impellers arranged for rotation in the casing. Mechanical energy delivered to the impeller(s) is transferred by the rotating impeller to the gas in form of kinetic energy. The gas accelerated by the impeller flows through a diffuser circumferentially surrounding the impeller, which collects the gas flow and reduces the speed thereof, converting kinetic energy into gas pressure.

For a better guidance of the gas flow through the diffuser, vaned diffusers have been developed. The diffuser vanes re-direct the gas flow in a more radial direction and improve the aerodynamic efficiency of the compressor. However, the diffuser vanes generate pressure pulses, which excite vibrations in the impeller blades. Impeller vibrations may cause failure of the impeller due to high cycle fatigue (HCF).

In order to alleviate the risk of impeller failure due to vibrations induced by diffuser vanes, centrifugal compressors have been developed, which have a so-called non-periodic diffuser. A non-periodic diffuser is a vaned diffuser, wherein the diffuser vanes are arranged in a non-symmetrical and non-periodic arrangement. Non-periodic diffusers for centrifugal compressors are disclosed in U.S. Pat. No. 7,845,900 and WO2011/096981, for instance.

Some embodiments of non-periodic diffusers for centrifugal compressors include diffuser vanes, which are arranged according to a variable pitch, i.e. arranged such that the angular spacing of two adjacent diffuser vanes, defining a flow passage therebetween, differs from the angular spacing of two other adjacent diffuser vanes defining another flow passage therebetween. It has been discovered that irregular (i.e. non-constant) angular spacing of the diffuser vanes reduces the excitation of vibrations in the impeller blades.

However, an asymmetric, non-periodic design of the diffuser vanes adversely affects the operation range of the compressor. More specifically, an increased angular spacing (pitch) between adjacent diffuser vanes causes a reduction of the solidity of the relevant flow passage. The solidity is the ratio between the vane chord (i.e. the distance between the trailing edge and the leading edge of the vane) and the pitch between two consecutive vanes. A reduced solidity causes a reduction of the mass flow range within which the compressor can operate without stall or without a significant reduction in performance. The minimum mass flow rate, at which a stall condition is achieved, increases as a result of reduced solidity. Therefore, while being beneficial in terms of vibration reduction, a variable vane pitch is detrimental in view of reduced operability of the compressor.

A novel diffuser design would be welcomed in the art, which improves the behavior of the compressor in terms of reduced impeller vibrations, with a less negative impact on the operative range of the compressor.

SUMMARY

According to one aspect of the present disclosure, a diffuser for a centrifugal turbomachine, such as a centrifugal compressor (or a centrifugal pump), is provided. The diffuser includes a plurality of diffuser vanes, circumferentially arranged around a diffuser axis. Each diffuser vane includes: a leading edge at a first distance from the diffuser axis, a trailing edge at a second distance from the diffuser axis, the second distance being greater than the first distance, a suction side facing radially inwardly and extending from the leading edge to the trailing edge, a pressure side facing radially outwardly and extending from the leading edge to the trailing edge. The diffuser vanes define a plurality of flow passages. More specifically, a flow passage is defined between each pair of adjacent, i.e. consecutive, vanes, between the suction side of a first diffuser vane and the pressure side of a second diffuser vane of each pair of diffuser vanes. The diffuser vanes are arranged with a non-constant pitch around the diffuser axis. To improve the operative range of the compressor and reduce the negative impact of pitch variation on compressor operability, the pitch between each pair of adjacently arranged first diffuser vane and second diffuser vane defining a respective flow passage therebetween is correlated to a chord, specifically to the length of the chord, of one of said first diffuser vane and second diffuser vane.

More specifically, the chord which is correlated to the pitch is the chord of the diffuser vane, the suction side whereof faces the flow passage.

The correlation between chord and pitch is such that the solidity reduction which would be caused by an increased pitch between diffuser vanes is offset, at least in part, by an increase in chord length.

Also disclosed herein is a vaned diffuser for a centrifugal turbomachine, in particular a centrifugal compressor (or a centrifugal pump), including a plurality of diffuser vanes, circumferentially arranged around a diffuser axis. Each diffuser vane includes: a leading edge, a trailing edge, a suction side facing radially inwardly and extending from the leading edge to the trailing edge, a pressure side facing radially outwardly and extending from the leading edge to the trailing edge. A respective flow passage is defined between the suction side of a first diffuser vane and the pressure side of a second diffuser vane of each pair of diffuser vanes arranged adjacent to one another. The diffuser vanes are arranged with a non-constant pitch around the diffuser axis. Moreover, the diffuser vanes have non-constant chords, and the ratio between the chord of the first diffuser vane and the pitch between the first diffuser vane and the second diffuser vane of each pair of diffuser vanes is substantially constant.

The diffuser vanes can be arranged such that the leading edges of all diffuser vanes are arranged on the same circumference around the diffuser axis. In such case the pitch between adjacent diffuser vanes, between which a respective flow passage is formed, is the distance, along said circumference, of the two leading edges of said two diffuser vanes forming the flow passage.

However, as will be described in greater detail in the following description of embodiments, the diffuser vanes can be arranged such that the leading edges are not placed all along the same circumference of minimum diameter around the diffuser axis. Rather, the two diffuser vanes of at least one pair of diffuser vanes forming a flow passage can be arranged with the respective leading edges at variable distance from the diffuser axis.

In more general terms, therefore, the pitch between adjacent, i.e. consecutive, diffuser vanes can be defined as the distance between the camberline of the two adjacent diffuser vanes, measured at the minimum distance from the diffuser axis, where said two diffuser vanes are both present.

Disclosed herein is also a turbomachine, and specifically a centrifugal compressor or a centrifugal pump, including at least one impeller and at least one vaned diffuser as defined above and below.

Additional features and embodiments of the novel diffuser and of the centrifugal turbomachine including the diffuser are outlined below and set forth in the appended claims, which form an integral part of the description.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION

It has been discovered that the negative impact on the compressor operability due to an increase of the pitch between adjacent diffuser vanes defining a flow passage of the diffuser can be offset by a corresponding increase of the chord length of the diffuser vane, the suction side whereof faces the flow passage. In this way the reduction of the solidity caused by increase of pitch is reduced, and at least partly offset by a corresponding variation of the chord. In some embodiments, the combination of pitch and chord variation can be such that the solidity remains substantially constant around the diffuser, i.e. in the various flow passages defined between pairs of adjacent vanes of the vaned diffuser.

Figure 1:
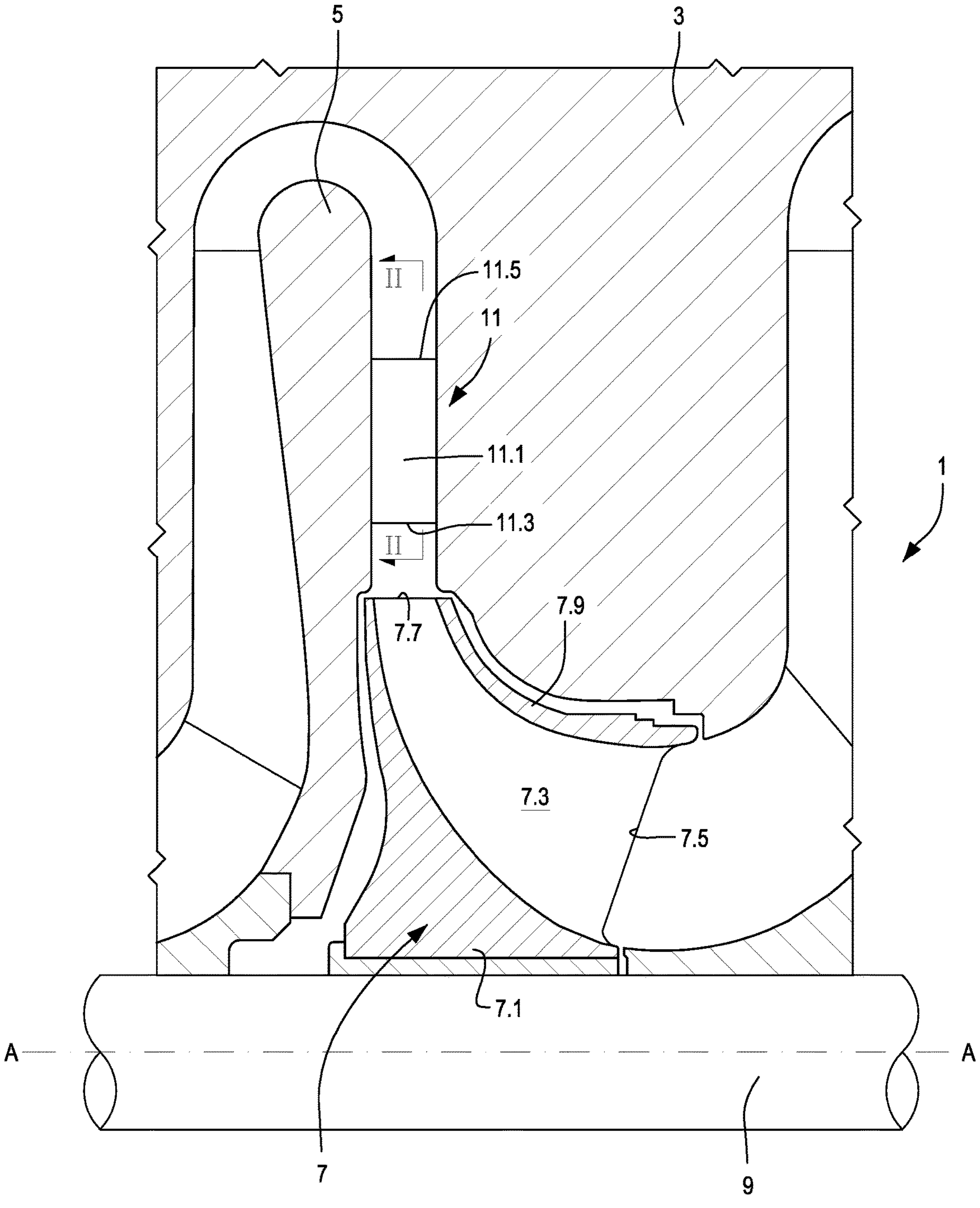
FIG. 1 illustrates a schematic sectional view of a compressor according to a plane containing the rotation axis of the compressor.

Referring now to FIG. 1, a portion of a centrifugal compressor 1 is shown in a sectional view along a plane containing the rotation axis of the compressor. The portion shown in FIG. 1 is limited to one stage of the centrifugal compressor. The number of compressor stages, and therefore the number of impellers, can differ from one compressor to another according to compressor design and compressor requirements. The novel features of a diffuser according to the present disclosure can be embodied in one, some or preferably all the diffusers of a given compressor.

The compressor comprises a casing 3, wherein diaphragms 5 separating consecutive compressor stages are arranged. Each compressor stage comprises an impeller 7 supported for rotation in the casing 3. The impeller 7 can be shrink-fitted on a rotary shaft 9. In other embodiments, not shown, the impeller 7 can be a stacked impeller, according to a design known to those skilled in the art of centrifugal compressors, and not disclosed herein. The impeller 7 has an impeller hub 7.1, wherefrom a plurality of impeller blades 7.3 project. Each impeller blade 7.3 has a leading edge 7.5 and a trailing edge 7.7. The leading edges 7.5 are arranged along an impeller inlet and the trailing edges 7.7 are arranged along an impeller outlet. The trailing edges 7.7 are arranged at a distance from the rotation axis A-A greater than the distance of the leading edges 7.5.

In the embodiment shown in FIG. 1, the impeller 7 further comprises a shroud 7.9. In other embodiments, not shown, the impeller 7 can be an un-shrouded impeller, in which case the shroud 7.9 is omitted.

Figure 2:
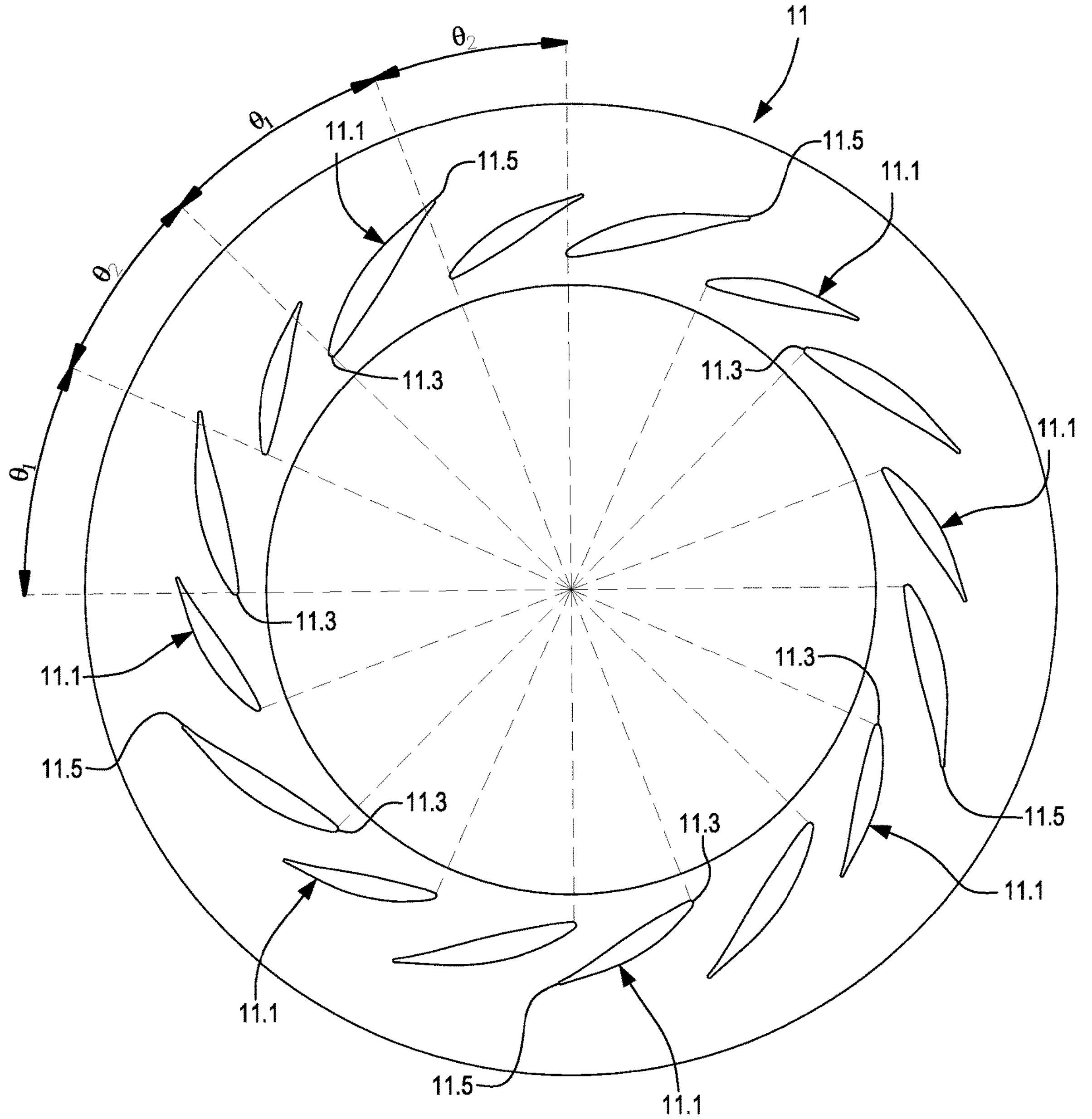
FIG. 2 illustrates a sectional view according to line II-II in FIG. 1 of the diffuser of the compressor of FIG. 1 in one embodiment.

Around the impeller outlet a diffuser 11 is arranged. The diffuser 11 surrounds the impeller 7 and is coaxial therewith. The diffuser 11 is shown in isolation in the sectional view of FIG. 2, taken along line II-II of FIG. 1, and in the isometric view of FIG. 3. An enlarged view of a detail of FIG. 2 is shown in FIG. 4. The diffuser 11 extends circumferentially around the impeller 7 and has an axis which is coincident with a rotation axis A-A of shaft 9.

The diffuser 11 is a so-called vaned diffuser, provided with a plurality of diffuser vanes 11.1 arranged around the diffuser axis A-A. The purpose of the diffuser vanes 11.1 is to re-direct the incoming gas flow in a more radial direction, i.e. to reduce the tangential component of the velocity of the gas flow exiting the diffuser 11 and increase pressure recovery and overall stage efficiency.

Each diffuser vane 11.1 comprises a leading edge 11.3 and a trailing edge 11.5. The distance between the leading edge 11.3 and the trailing edge 11.5 is referred to as the chord B of the diffuser vane 11.1. The leading edges 11.3 are at a distance from the axis A-A smaller than the distance of the trailing edges 11.5.

Each diffuser vane 11.1 further comprises a suction side 11.7 and a pressure side 11.9. The aerodynamic load on each diffuser vane 11.1 is such that the suction side is the vane side looking towards the inlet of the diffuser 11, i.e. the side of the diffuser vane 11.1 facing radially inwardly. Conversely, the pressure side is the side of the diffuser vane 11.1 facing the outlet of the diffuser 11, i.e. facing radially outwardly.

The gas flow direction at the inlet of the diffuser 11 depends upon the mass flow rate through the compressor. A more radial flow direction (lower tangential speed component) occurs at higher mass flow rates and a more tangential flow direction (higher tangential speed component) occurs at lower mass flow rates. The pressure ratio across the compressor stage increases as the mass flow rate decreases.

Figure 5:
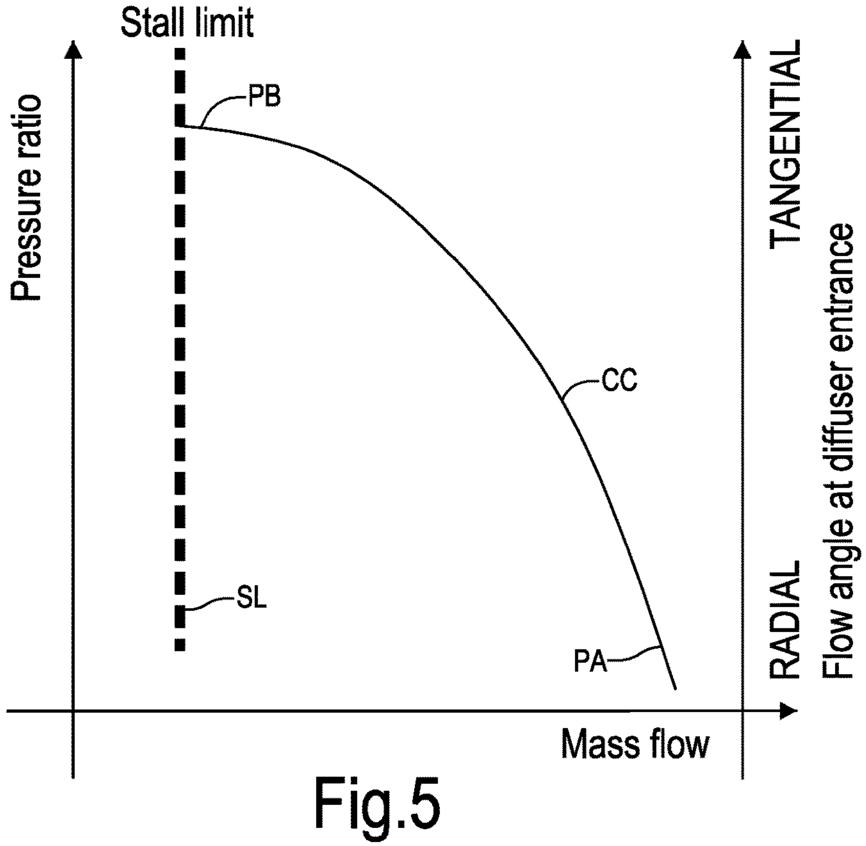
FIG. 5 schematically illustrates a characteristic operating curve of a compressor stage in a mass flow-vs-pressure ratio diagram.
Figure 6:
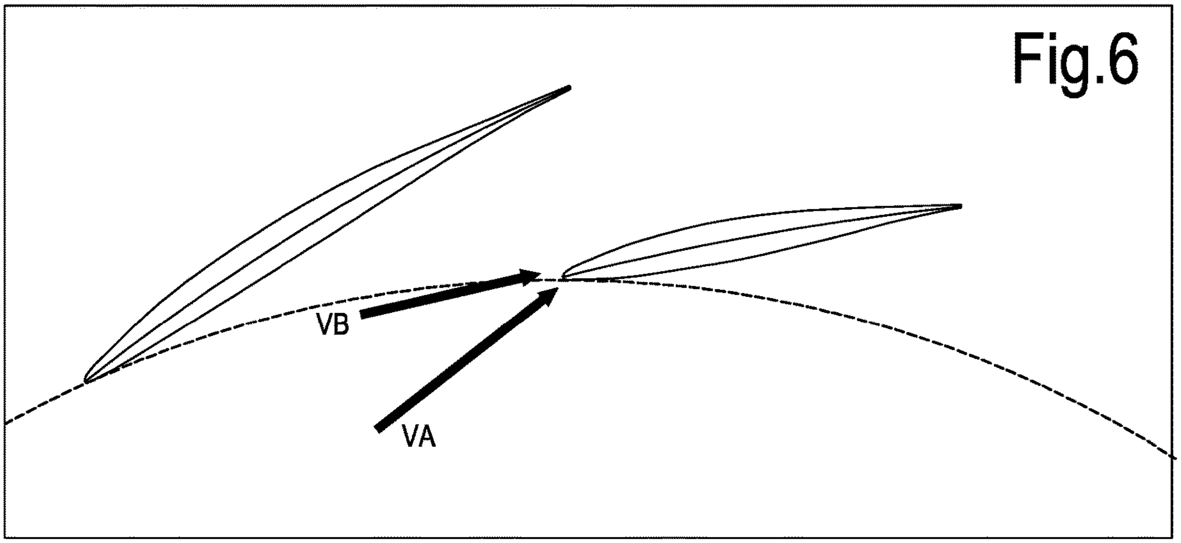
FIG. 6 illustrates the flow direction in two different operating points of the diagram of FIG. 5.

FIG. 5 schematically illustrates a characteristic curve of a centrifugal compressor stage in a mass-flow rate-vs.-pressure ratio diagram. The mass flow rate is plotted on the horizontal axis and the pressure ratio is plotted on the vertical axis. The characteristic curve is labeled CC. The flow angle at the diffuser entrance, i.e. the direction of the gas velocity at the inlet of the diffuser 11, becomes more tangential as the mass-flow rate drops. FIG. 6 illustrates schematically the flow angles in two opposite operating points PA and PB of the characteristic curve. VA and VB are the velocity vectors at the leading edge of a diffuser vane 11.1 corresponding the operating points PA and PB, respectively.

The mass flow rate of the compressor has a lower limit at which a stall condition arises. This limit is indicated as stall limit SL in the diagram of FIG. 5. The diffuser vanes 11.1 stall predominantly on the suction side 11.7. When the velocity vector achieves the inclination of vector VB, the flow detaches from the suction side 11.7 of the diffuser vane 11.1. To prevent damages to the compressor, the operating point of the compressor shall be maintained at a safety distance from the stall limit SL.

The stall limit SL may shift to the right of the diagram of FIG. 5, thus reducing the operating range of the compressor in terms of mass flow rate, if the solidity of the diffuser is reduced. The solidity is defined as the ratio between the chord of the diffuser vanes 11.1 and the spacing between two consecutive, i.e. adjacently arranged diffuser vanes 11.1. In vaned diffusers where the pitch between diffuser vanes is constant, the solidity is defined as $$\sigma = \frac{B}{S} \tag{1}$$

and is identical for each flow passage. B is the chord of the diffuser vanes and S is the pitch, i.e. the spacing between adjacent diffuser vanes 11.1, i.e. the distance of two consecutively arranged diffuser vanes 11.1.

The solidity affects the stall limit, in that lower solidity may imply an earlier stall, i.e. a shift of the stall limit towards the right in the diagram of FIG. 5.

In vaned diffusers of the current art, where the pitch between the circumferentially arranged diffuser vanes 11.1 is non-constant, solidity is again defined as $$\sigma i = \frac{B}{Si} \tag{2}$$

for each $i^{th}$ flow passage, wherein Si is the spacing, i.e. the pitch between two consecutive diffuser vanes 11.1 defining the $i^{th}$ flow passage. Since solidity is non-constant around the diffuser, a stall condition may arise at the flow passage having the smallest solidity, i.e. the largest pitch Si. For the compressor to operate in safe conditions, the operating point shall be at a safety distance from the stall limit of the most critical flow passage, i.e. the one having the largest pitch. This substantially reduces the operability range of the compressor. Thus, according to the prior art compressor design, a reduction of the vibrations, aimed at reducing the risk of high cycle fatigue failure of the impeller, reduces the operability of the compressor.

In order to alleviate the above drawback, embodiments of the present disclosure provide for a novel approach in diffuser design. The reduction of solidity which would be determined by an increased pitch between adjacent diffuser vanes 11.1 is balanced by an increase of the chord of the relevant diffuser vane, and more specifically of the diffuser vane 11.1 at the suction side whereof stall may occur. This diffuser vane is the one, the suction side whereof faces the relevant flow passage.

Figure 3:
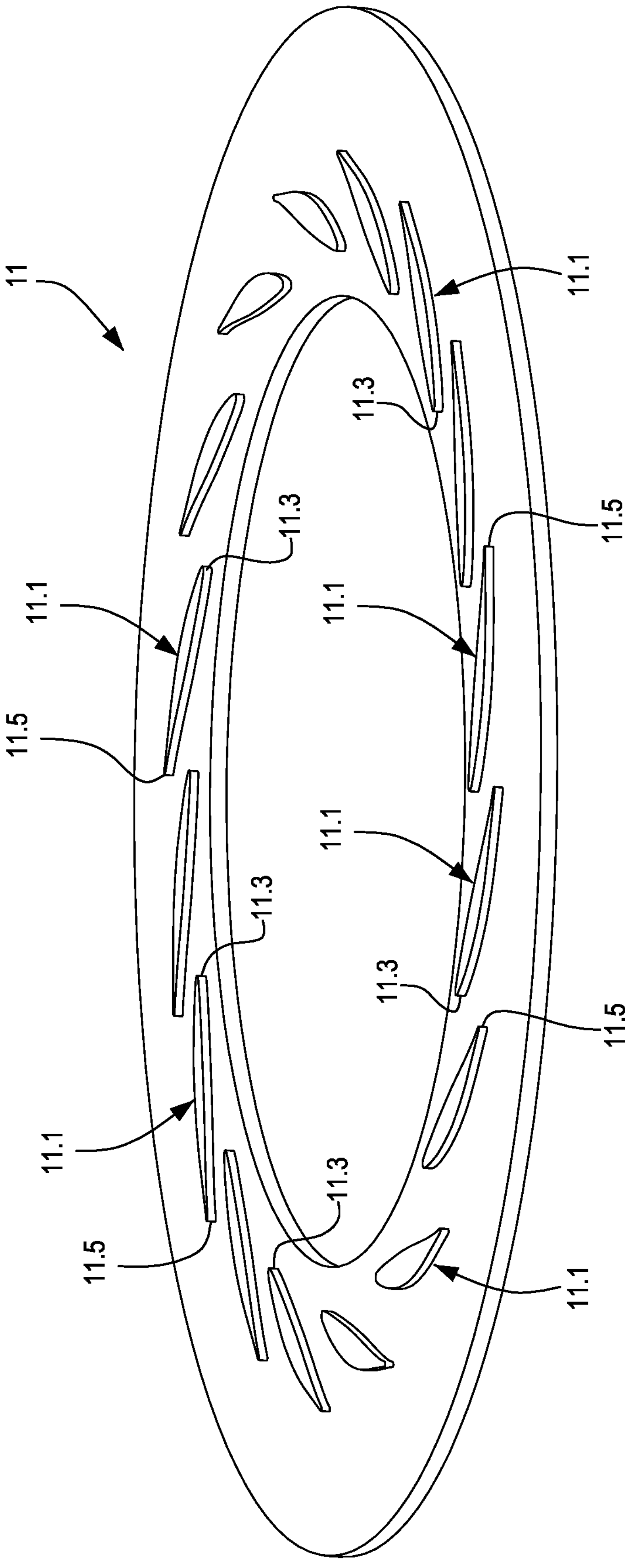
FIG. 3 illustrates an isometric view of the diffuser of the compressor of FIG. 1.
Figure 4:
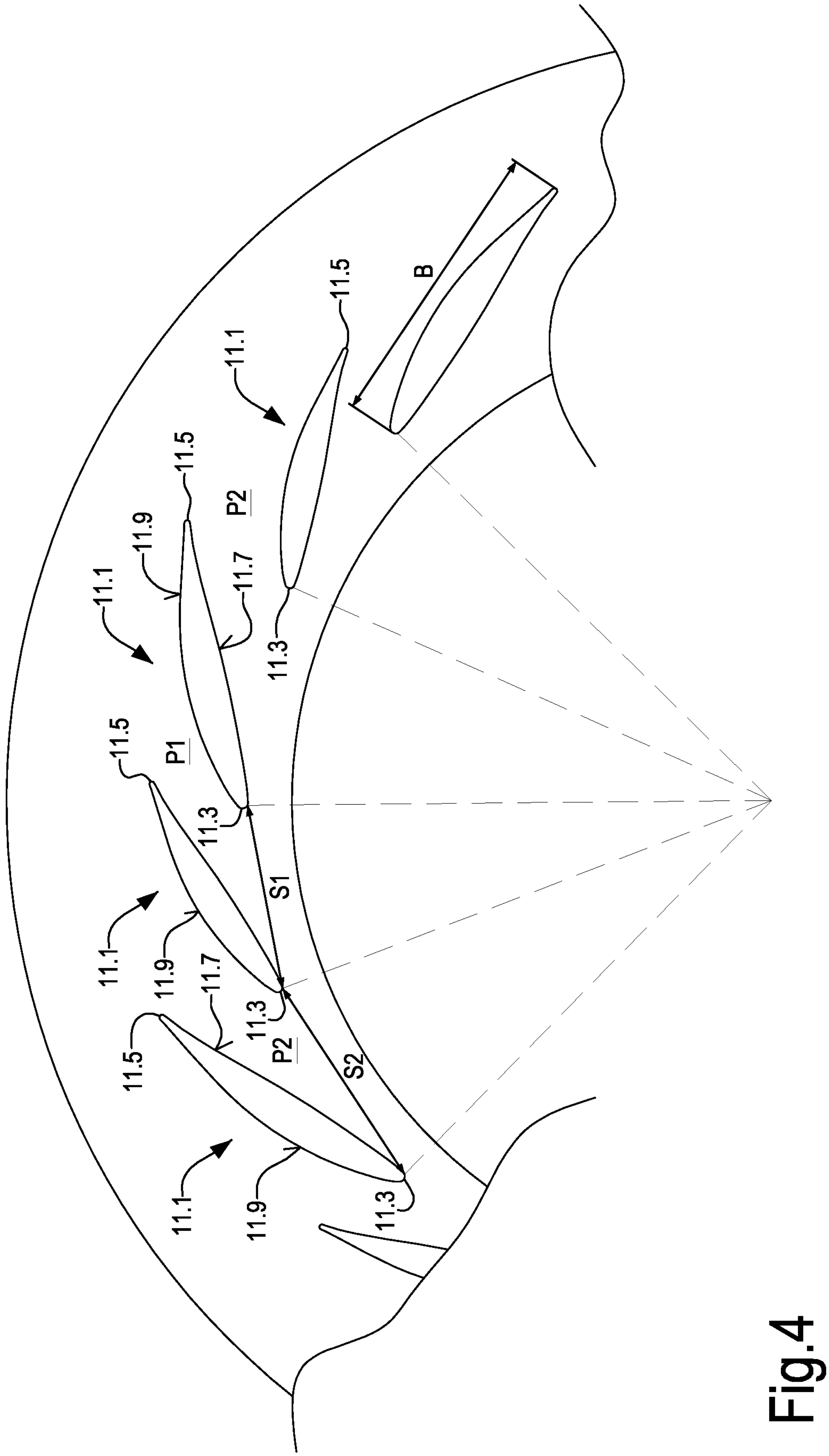
FIG. 4 illustrates an enlarged detail of FIG. 2.

Referring to FIG. 4, with continuing reference to FIGS. 1, 2 and 3, without any loss of generality, an enlargement of a portion of the diffuser 11 is shown. In this embodiment, the diffuser vanes 11.1 are arranged according to two different pitches or spacing S1 and S2. More specifically the spacing S2 is larger than S1.

More specifically, in this embodiment, consecutive pairs of diffuser vanes 11.1 are arranged alternatively with spacing S1 and S2. In other words, moving in a clockwise direction around the diffuser axis, a first passage P1 having a spacing S1 between the diffuser vanes 11.1 defining it is followed by a second passage P2 having a spacing S2 (S2>S1) between the respective diffuser vanes 11.1 defining the second passage P2. The next passage has again a spacing S1, and so on. In this embodiment the passages P1, P2 have non-constant pitches.

If the chords B of the three subsequently arranged vanes forming passages P1 and P2 were equal, the solidity of the first passage P1 would be higher than the solidity of the second passage P2 as follows:

$$\sigma_{P1} = \frac{B}{S1} > \frac{B}{S2} = \sigma_{P2} \tag{3}$$

wherein

Si is the pitch or spacing of the $i^{th}$ flow passage $\sigma_{Pi}$ is the solidity of the flow passage Pi.

The passage P2 having a lower solidity may cause an earlier stall. P2 would then be the limiting passage of the compressor operability. To avoid this, the embodiment disclosed herein provides for diffuser vanes 11.1 having a variable, i.e. non-constant, chord B. More specifically, the chord B of the diffuser vanes 11.1 is correlated to the pitch, i.e. to the spacing S between consecutive or adjacent diffuser vanes 11.1, such that an increased chord B of one of the diffuser vanes forming a passage P re-balances the passage solidity as follows:

$$\sigma_{P1} = \frac{B1}{S1} \approx \frac{B2}{S2} = \sigma_{P2} \tag{4}$$

wherein Bi is the chord of one of the two diffuser vanes 11.1 defining the $i^{th}$ passage Pi. More specifically, Bi is the chord of the diffuser vane, the suction side 11.7 whereof faces the passage Pi, as illustrated in FIG. 4. The solidity of a diffuser flow passage is defined, in the present case, as the ratio between the chord of the diffuser vane 11.1, the suction side whereof faces the flow passage, and the pitch between the two diffuser vanes 11.1, between which the flow passage is defined.

By making the chord B of the first diffuser vane 11.1 of each $i^{th}$ flow passage Pi dependent upon the pitch or spacing Si between the two diffuser vanes forming the passage, the effect of solidity variation provoked by the pitch variation is balanced by the chord variation.

Thus, the beneficial effect of a pitch variation in terms of reduction of impeller vibrations is achieved without the negative impact on compressor operability, by balancing the solidity reduction, which would be caused by an increased pitch, with an increase of the chord of the relevant diffuser vane 11.1.

In preferred embodiments, the relationship between each diffuser vane chord Bi and the vane pitch or spacing Si of each $i^{th}$ flow passage Pi is such that the solidity $\sigma_{Pi}$ of the flow passage remains constant.

However, a strictly constant solidity value is not mandatory. Beneficial effects in terms of enhanced compressor operability can be achieved also if the solidity is maintained substantially constant around a pre-set value. As used herein, "substantially constant" can be understood as a solidity which is within a range of +/−20% around a constant pre-set solidity value. According to embodiments disclosed herein, "substantially constant" can be understood as a solidity which is maintained within a range of +/−10% around the pre-set constant solidity value and preferably a range of +/−5%, and more preferably a range of +/−2%.

Figure 7:
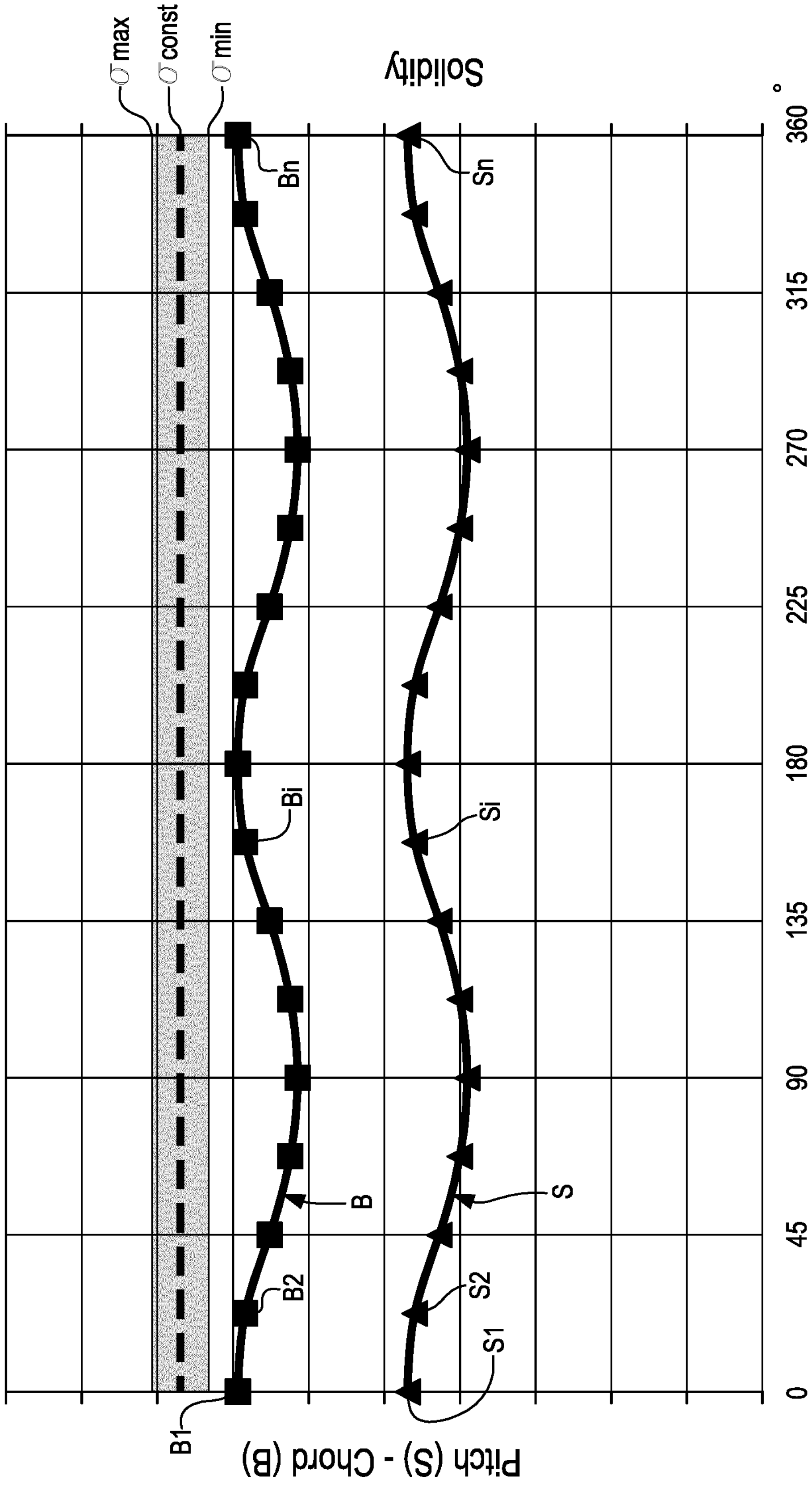
FIGS. 7, 8 and 9 illustrate the variation of the pitch, chord and solidity in a diffuser according to the present disclosure, in three embodiments.

FIG. 7 illustrates a diagram showing the pitch (spacing) S and the cord B against the angular position of the flow passages, plotted on the abscissa. The pitches of the sequentially arranged pairs of diffuser vanes are labeled S1, S2, . . . Si, . . . Sn. The corresponding chord of the first diffuser vane 11.1 of each flow passage P1, P2, . . . Pi, . . . Pn is labeled B1, B2, . . . Bi, . . . Bn. The horizontal straight line $\sigma_{const}$ indicates a constant solidity value, while $\sigma_{min}$ and $\sigma_{max}$ indicate the minimum and the maximum values of an admissible range of solidity values, around the pre-set constant solidity value $\sigma_{const}$. As noted above $\sigma_{min}$ can be 20% less than $\sigma_{const}$, or preferably 10% less, or more preferably 5% less or even more preferably 2% less than $\sigma_{const}$. Similarly, $\sigma_{max}$ can be 20% more than $\sigma_{const}$, preferably 10% more, or more preferably 5% more, or even more preferably 2% more than $\sigma_{const}$.

In FIGS. 2, 4 a cyclic variation of the pitch S between adjacent diffuser vanes 11.1 and a corresponding cyclic variation of the vane chord B are shown, according to two different pitches S1 and S2. In other embodiments, the vanes can be arranged according to more than two different pitches or spacing S1, S2 (FIG. 7).

Figure 8:
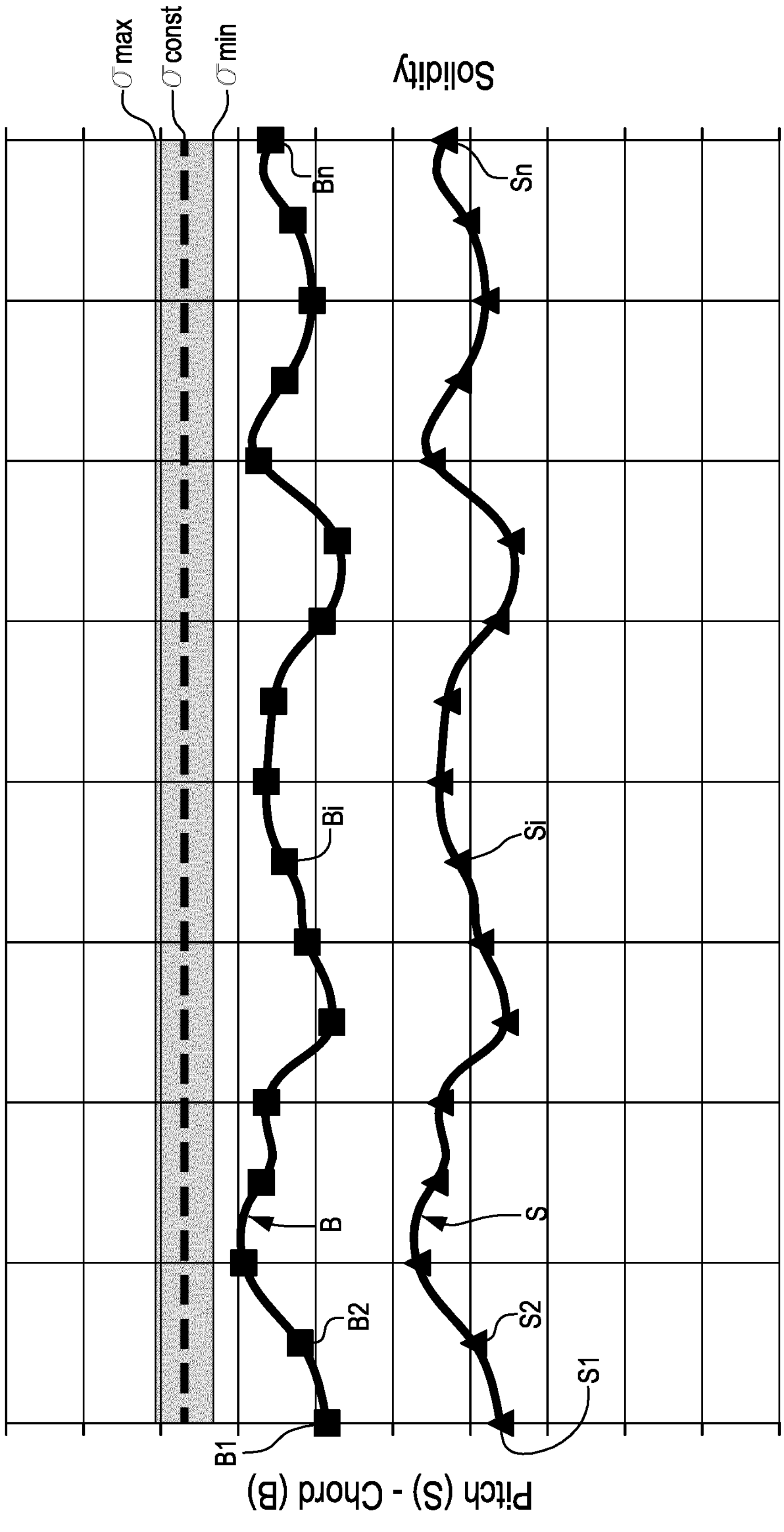
Figure 10:
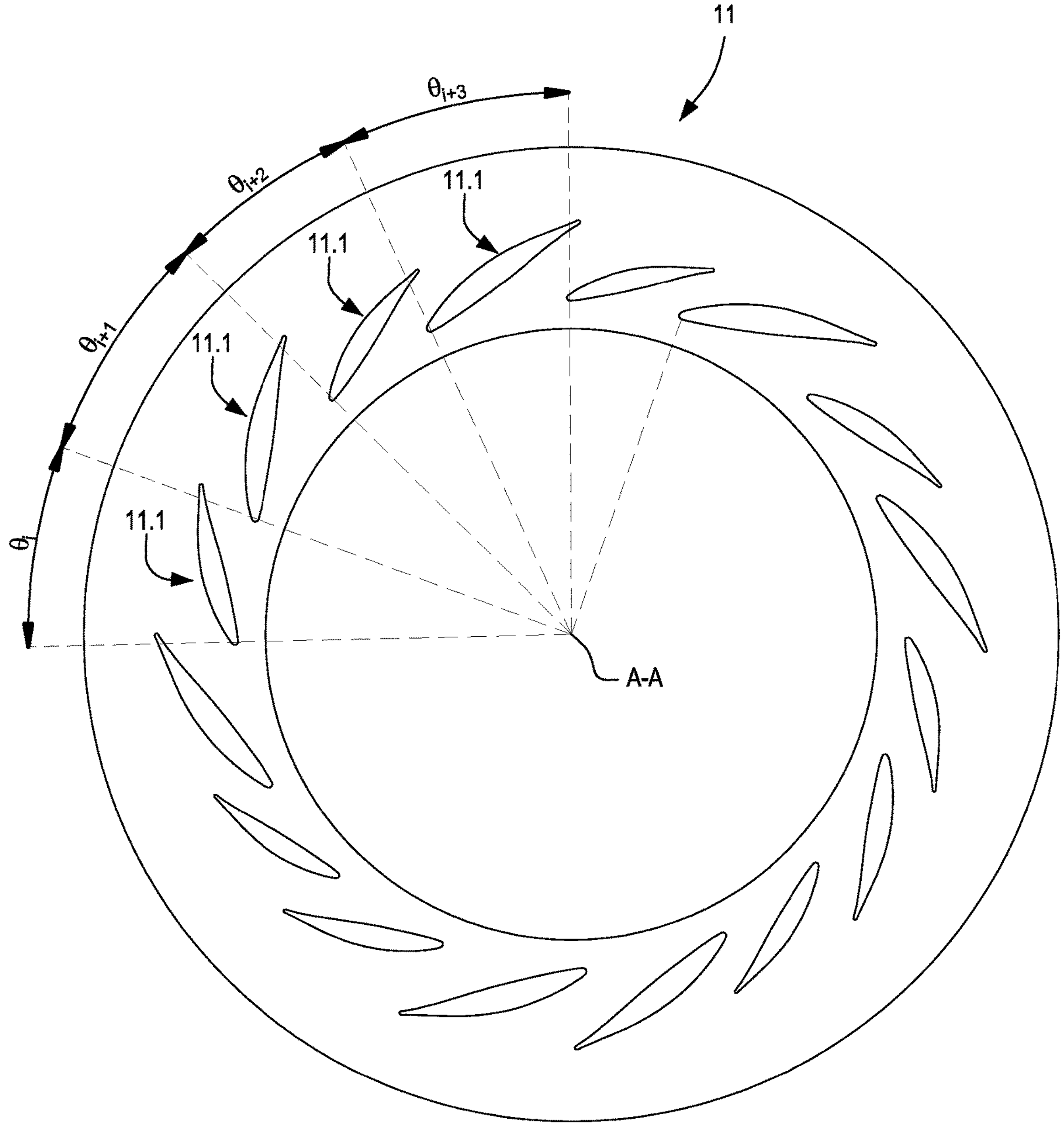
FIG. 10 illustrates a sectional view according to line II-II in FIG. 1 of the diffuser of the compressor of FIG. 1 in another embodiment.

In other embodiments, the variation of both the pitch and the chord can be random, as shown in FIG. 8, rather than cyclic. FIG. 10 shows a sectional view of a diffuser 11 with randomly arranged diffuser vanes 11.1.

Figure 9:
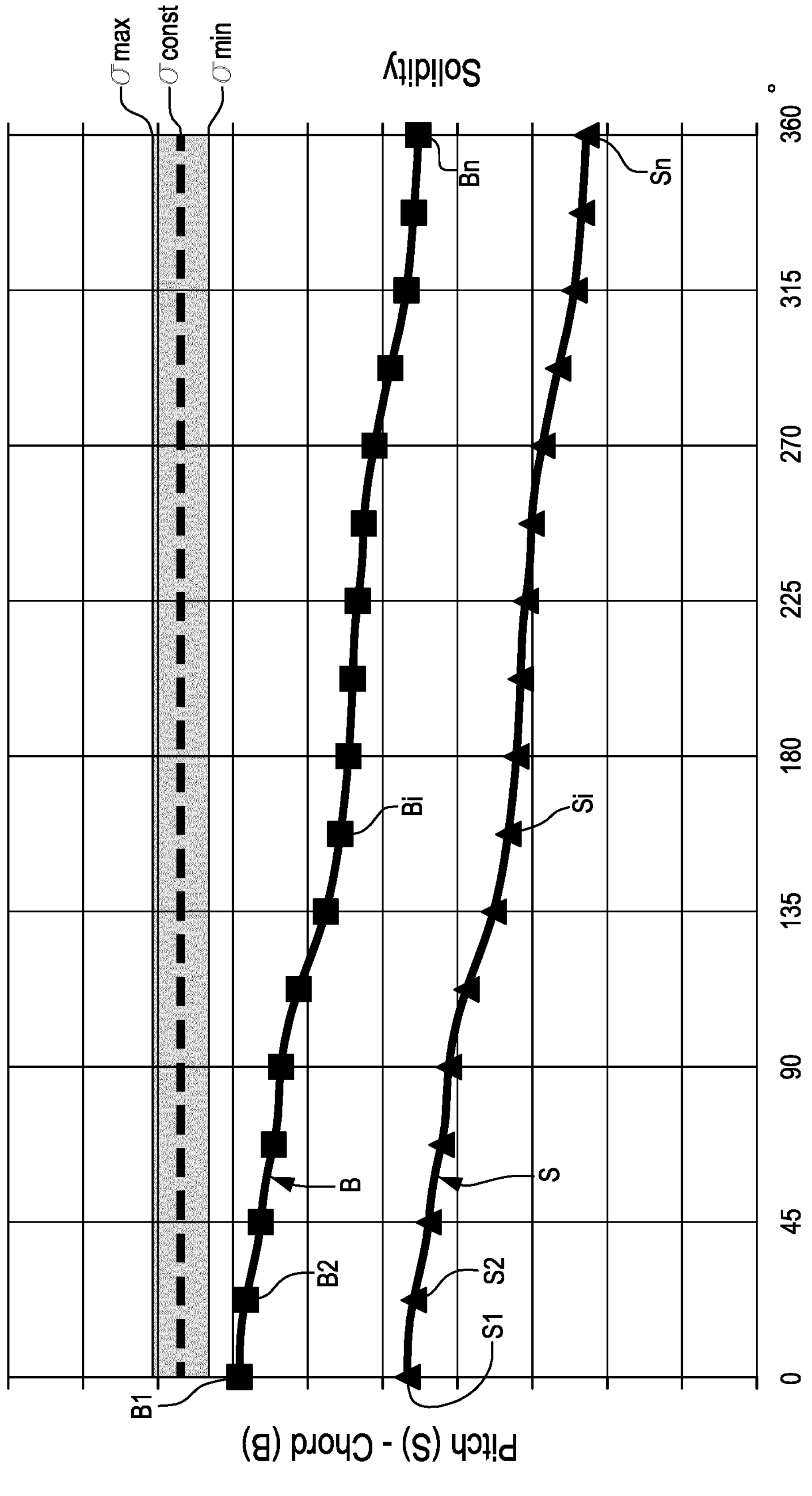

In yet further embodiments the variation can be monotone, i.e. the pitch and the chord may gradually decrease around the diffuser axis A-A starting from a first flow passage to a last diffuser passage, as shown in FIG. 9.

In order to further reduce vibrations of the impeller blades, additional features of the diffuser vanes can be made variable around the diffuser axis. According to some embodiments, for instance, the diffuser vanes 11.1 may have variable profiles. In some embodiments, the diffuser vanes may have variable radial positions of the leading edge and/or of the trailing edge. Additionally, or alternatively, the diffuser vanes may have a variable inclination.

Moreover, while in FIG. 1 the diffuser has a constant height, in some embodiments, the diffuser can have a variable height in the tangential direction and/or in the flow direction.

The above described embodiments specifically refer to centrifugal compressors. However, novel diffusers according to the present disclosure can be used with advantage also in centrifugal pumps, having a structure similar to the one shown in FIG. 1

Exemplary embodiments have been disclosed above and illustrated in the accompanying drawings. It will be understood by those skilled in the art that various changes, omissions and additions may be made to that which is specifically disclosed herein without departing from the scope of the invention as defined in the following claims.

The invention claimed is:

1. A diffuser for a centrifugal turbomachine, the diffuser comprising:
- an annular body having a central axis; and
- a plurality of diffuser vanes circumferentially arranged around the annular body, the plurality of diffuser vanes comprising a first set of first diffuser vanes alternating with a second set of second diffuser vanes about the central axis so as to form adjacent vane sets, each of the adjacent vane sets including one of the first diffuser vanes and one of the second diffuser vanes that are adjacent to one another, and each of the adjacent vane sets creating a flow passage therebetween,
- each of the first diffuser vanes and the second diffuser vanes comprising:
  - a leading edge disposed at a first distance from the central axis that is the same for both the first diffuser vanes and the second diffuser vanes,
  - a trailing edge at a second distance from the central axis, the second distance being greater than the first distance,
  - a suction side facing radially inwardly and extending from the leading edge to the trailing edge, and
  - a pressure side facing radially outwardly and extending from the leading edge to the trailing edge,
- wherein, for each of the first diffuser vanes and the second diffuser vanes, a chord length defines a distance between the leading edge and the trailing edge,
- wherein, for each adjacent vane set, a pitch defines a distance between the leading edge of first diffuser vane and the leading edge of the second diffuser vane,
- wherein the pitch alternates between a first pitch distance and a second pitch distance for each adjacent vane set about the center axis, and
- wherein the chord length of the diffuser vanes forming the suction side of each flow passage is selected so that solidity of each flow passage is constant.

2. The diffuser of claim 1, wherein the first diffuser vanes and the second diffuser vanes have variable profiles.

3. The diffuser of claim 1, wherein the first diffuser vanes and the second diffuser vanes have variable inclinations.

4. The diffuser of claim 1, wherein said diffuser has a height that is variable in a tangential direction.

5. A centrifugal turbomachine comprising:
- an impeller arranged for rotation around a rotation axis; and
- a diffuser according to claim 1.

6. A centrifugal compressor, comprising:
- an impeller arranged for rotation around a rotation axis; and
- a diffuser according to claim 1.

7. The diffuser of claim 1, wherein said diffuser has a height that is variable in a flow direction.

8. The diffuser of claim 1, wherein the first pitch is correlated to the chord of the second diffuser vane.

9. The diffuser of claim 1, wherein the second pitch is correlated to the chord of the first diffuser vane.

10. The diffuser of claim 1, wherein the second pitch is correlated to the chord of the second diffuser vane.

* * * * *